United States Patent
Chiari et al.

(10) Patent No.: US 11,645,476 B2
(45) Date of Patent: May 9, 2023

(54) GENERATING SYMBOLIC DOMAIN MODELS FROM MULTIMODAL DATA

(71) Applicant: International Business Machines Corporation, Armonk, NY (US)

(72) Inventors: Mattia Chiari, Castenedolo (IT); Yufang Hou, Dublin (IE); Hiroshi Kajino, Tokyo (JP); Akihiro Kishimoto, Castleknock (IE); Radu Marinescu, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 17/035,777

(22) Filed: Sep. 29, 2020

(65) Prior Publication Data

US 2022/0100968 A1    Mar. 31, 2022

(51) Int. Cl.
  *G06F 40/51*    (2020.01)
  *G06F 40/47*    (2020.01)
  (Continued)

(52) U.S. Cl.
  CPC ............. *G06F 40/47* (2020.01); *G06F 40/51* (2020.01); *G06N 3/04* (2013.01); *G06N 3/08* (2013.01)

(58) Field of Classification Search
  CPC ........ G06F 40/47; G06F 40/51; G06F 40/289; G06F 40/30; G06N 3/04; G06N 3/08; G06N 3/084; G06N 3/02; G06N 20/00; G06N 7/005; G16H 10/60; G06Q 10/06311; G06Q 30/0633
  See application file for complete search history.

(56) References Cited

U.S. PATENT DOCUMENTS 2,020,017 A * 11/1935 Burgess ................ E01C 11/185
                                                       404/134
9,740,978 B2    8/2017 Hassanzadeh
                    (Continued)

FOREIGN PATENT DOCUMENTS

CA        3046327 A1    6/2018

OTHER PUBLICATIONS

"Fast Downward home page" http://www.fast-downward.org/, Last Accessed Oct. 15, 2020, 2 pages.
(Continued)

*Primary Examiner* — Richemond Dorvil
*Assistant Examiner* — Nadira Sultana
(74) *Attorney, Agent, or Firm* — Michael A. Petrocelli

(57) ABSTRACT

A computer generates a formal planning domain description. The computer receives a first text-based description of a domain in an AI environment. The domain includes an action and an associated attribute, and the description is written in natural language. The computer receives the first text-based description of the domain and extracts a first set of domain actions and associated action attributes. The computer receives audio-visual elements depicting the domain, generates a second text-based description, and extracts a second set of domain actions and associated action attributes. The computer constructs finite state machines corresponding to the extracted actions and attributes. The computer converts the FSMs into a symbolic model, written in a formal planning language, that describes the domain.

20 Claims, 5 Drawing Sheets

(51) Int. Cl.
  *G06N 3/04* (2023.01)
  *G06N 3/08* (2023.01)

(56) References Cited

U.S. PATENT DOCUMENTS

| | | | |
|---|---|---|---|
| 10,099,382 B2 | 10/2018 | Hill | |
| 10,154,756 B2 | 12/2018 | Hall | |
| 10,216,725 B2 | 2/2019 | Tang | |
| 10,552,749 B2 | 2/2020 | Riabov | |
| 10,556,348 B2 | 2/2020 | Stoyanchev | |
| 10,789,755 B2* | 9/2020 | Amer | G06V 20/41 |
| 2015/0228004 A1* | 8/2015 | Bednarek | G06Q 30/0633 705/26.8 |
| 2018/0218475 A1* | 8/2018 | Riabov | G06N 20/00 |
| 2018/0285770 A1* | 10/2018 | Manikonda | G06N 5/045 |
| 2018/0307779 A1 | 10/2018 | Tellex | |
| 2018/0314942 A1* | 11/2018 | Shinn | A63F 13/67 |
| 2018/0314963 A1 | 11/2018 | Kovács | |
| 2019/0084151 A1 | 3/2019 | Bai | |
| 2019/0197111 A1* | 6/2019 | Garrote | G06F 40/30 |
| 2019/0197402 A1 | 6/2019 | Kovács | |
| 2019/0228495 A1 | 7/2019 | Tremblay | |
| 2019/0232489 A1 | 8/2019 | Pascanu | |
| 2019/0366557 A1 | 12/2019 | Gewickey | |
| 2019/0389060 A1 | 12/2019 | Roy Chaudhuri | |
| 2020/0005162 A1 | 1/2020 | Kattepur | |
| 2020/0030971 A1 | 1/2020 | Oleynik | |
| 2020/0104769 A1* | 4/2020 | Bnayahu | G16H 10/60 |
| 2020/0122038 A1* | 4/2020 | Ebrahimi | A63F 13/67 |
| 2020/0122039 A1* | 4/2020 | Meuleau | A63F 13/67 |
| 2020/0174455 A1* | 6/2020 | Fox | G06Q 10/06311 |
| 2020/0257857 A1* | 8/2020 | Peper | G10L 15/1822 |

OTHER PUBLICATIONS

Ames et al. "Learning Symbolic Representations for Planning with Parameterized Skills" 2018 IEEE/RSJ International Conference on Intelligent Robots and Systems (IROS) Madrid, Spain, Oct. 1-5, 2018, 8 pages.

Andreson et al. "Active Exploration for Learning Symbolic Representations" 31st Conference on Neural Information Processing Systems (NIPS 2017), Long Beach, CA, USA., 11 pages.

Asai "Unsupervised grounding of planable first-order logic representation from images", arXiv:1902.08093v4 [cs.AI] Mar. 27, 2019, 9 pages.

Asai et al. "Classical Planning in Deep Latent Space: Bridging the Subsymbolic-Symbolic Boundary" arXiv:1705.00154v3 [cs.AI] Dec. 3, 2017, 26 pages.

Asai et al. "Towards Stable Symbol Grounding with Zero-Suppressed State AutoEncoder", arXiv:1903.11277v1 [cs.LG] Mar. 27, 2019, 9 pages.

Asai, Masataro, "Neural-Symbolic Descriptive Action Model from Images: The Search for STRIPS", arXiv:1912.05492v1 [cs.AI] Dec. 11, 2019, 10 pages.

Bonet et al. "Learning First-Order Symbolic Representations for Planning from the Structure of the State Space", 24th European Conference on Artificial Intelligence—ECAI 2020, 8 pages.

Chiari "Generating Symbolic Domain Models From Multimodal Data" U.S. Appl. No. 17/035,777, filed Sep. 29, 2020, 45 pages.

Hu et al. "Active Learning With Partial Feedback" ICLR 2019, 14 pages.

Illanes et al. "Leveraging Symbolic Planning Models in Hierarchical Reinforcement Learning" KR2ML Workshop at NeurIPS 2019, Vancouver, Canada., 10 pages.

Kishimoto, et al., "Symbolic Model Training With Active Learning", U.S. Appl. No. 17/132,776, filed Dec. 23, 2020.

Konidaris et al. "Constructing Symbolic Representations for High-Level Planning", In AAAI (pp. 1932-1938), 9 pages.

List of IBM Patents or Patent Applications Treated as Related. Filed Herewith. 2 pages.

Luo et al. "Hierarchical Active Learning with Proportion Feedback on Regions", Mach Learn Knowl Discov Databases. 2019 ; 11052: 464-480. doi:10.1007/978-3-030-10928-8_28. 20 pages.

Asai, et al. ,"Towards Stable Symbol Grounding with Zero-Suppressed State AutoEncoder", Proceedings of the Twenty-Ninth International Conference on Automated Planning and Scheduling (ICAPS 2019), pp. 592-600, <https://aaai.org/ojs/index.php/ICAPS/article/view/3526/3394>.

Asai, Masataro, "Unsupervised Grounding of Plannable First-Order Logic Representation from Images", © 2019, Association for the Advancement of Artificial Intelligence, arXiv:1902.08093v4, Mar. 27, 2019, 9 pages.

Edelkamp, et al., "Introducing Dynamic Object Creation to PDDL Planning", Last printed Sep. 27, 2020, 7 pages.

Feng, et al., "Extracting Action Sequences from Texts Based on Deep Reinforcement Learning", arXiv:1803.02632v1, Mar. 7, 2018, 7 pages, <https://arxiv.org/pdf/1803.02632.pdf>.

Garrett, et al., "PDDLStream: Integrating Symbolic Planners and Blackbox Samplers via Optimistic Adaptive Planning", arXiv:1802.08705v4, Jan. 21, 2020, 12 pages.

Kootbally, et al., "Towards robust assembly with knowledge representation for the planning domain definition language (PDDL)", Robotics and Computer-Integrated Manufacturing vol. 33, 2015, pp. 42-55.

Lindsay, et al., "Framer: Planning Models from Natural Language Action Descriptions", Proceedings of the Twenty-Seventh International Conference on Automated Planning and Scheduling (ICAPS 2017), pp. 434-442, <https://ioaoff.com/publication/2017/icaps/>.

Mell et al., "The NIST Definition of Cloud Computing", National Institute of Standards and Technology, Special Publication 800-145, Sep. 2011, 7 pages.

Miglani, S., "NL to PDDL: One-Shot Learning of Planning Domains from Natural Language Process Manuals", Masters Thesis, Delft University of Technology, Aug. 27, 2019, 111 pages.

Srivastava, et al., "Using Classical Planners for Tasks with Continuous Operators in Robotics", Citeseerx, 9 pages, <https://citeseerx.ist.psu.edu/viewdoc/summary?doi=10.1.1.310.2334>.

Tatsubori, et al., "Design and Implementation of Linked Planning Domain Definition Language", arXiv:1912.07834v1, Dec. 17, 2019, 17 pages.

"wikiHow: How-to instructions you can trust.", wikiHow, last printed Sep. 27, 2020, 25 pages, <https://www.wikihow.com/Main-Page>.

* cited by examiner

GENERATING SYMBOLIC DOMAIN MODELS FROM MULTIMODAL DATA

BACKGROUND

The present invention relates generally to the field of Artificial Intelligence (AI) planning, and more specifically, to automated generation of symbolic models from multimodal data.

Symbolic models are a tool used in AI planning to describe and generate domain models. The domain models represent a planned task having associated actions and expected results or goals to be met. Symbolic models used to describe these domains are often generated manually by a software developer and can be used to guide the behavior of robotic devices. Databases of domain task reference information are available and may be used by developers to generate domain models. However, despite the availability of reference material, manual model generation is labor intensive, and the time and expertise required to generate models manually is, unfortunately, a limiting factor in effective domain model development.

SUMMARY

In embodiments according to the present invention, a computer implemented method to generate a formal planning domain description, includes receiving, by the computer, a first text-based description of a domain in an AI environment, where the domain includes at least one action and at least one associated attribute. The description is written in natural language. In response to receiving the first text-based description of said domain, the computer extracts a first set of domain actions and a first set of associated action attributes. The computer receives at least one audio-visual element depicting an aspect of said domain, and in response, generates a second text-based description of the domain. The computer extracts second set of domain actions and a second set of associated action attributes from a second text-based description and constructs finite state machines corresponding to each of the extracted actions and associated action attributes. The computer converts the FSMs into a symbolic model that describes the domain, and the symbolic model is written in a formal planning language. According to some aspects of the invention, the extracting domain actions and said associated action attributes includes semantic parsing of said text-based descriptions. According to some aspects of the invention, the audio-visual element includes a temporal sequence of images depicting one or more specific aspects of said domain. According to some aspects of the invention, at least a portion of the second text-based description of said domain is generated by the computer with reference to an image recognition module. According to some aspects of the invention, the formal planning language is Planning Domain Definition Language (PDDL). According to some aspects of the invention, the computer includes an interactive interface and the computer provides the symbolic model to a user via the interactive interface user input and adjustment of the model responsive to the user input. According to some aspects of the invention, the computer uses a deep learning algorithm to infer at least one action attribute not stated in said text-based descriptions. According to some aspects of the invention, at least one of the sets of action attributes includes an action precondition and an action effect. According to some aspects of the invention, the generation the second text-based description of said domain is conducted by the computer with reference to audio-visual element aspects selected from audio aspects, textual captioning aspects, and visual aspects.

In another embodiment of the invention, a system to optimize input component enablement for a plurality of communication devices each having an input component associated with at least one participant in an electronic group meeting, which comprises: a computer system comprising a computer readable storage medium having program instructions embodied therewith. The program instructions are executable by a computer to cause the computer to: generate a formal planning domain description, which comprises: a computer system comprising a computer readable storage medium having program instructions embodied therewith, the program instructions executable by a computer to cause the computer to: receive a first text-based description of a domain in an AI environment, where said domain includes at least one action and at least one attribute associated therewith, said description being written in natural language; responsive to receiving said first text-based description of said domain, extract a first set of domain actions and a first set of associated action attributes; receive at least one audio-visual element depicting an aspect of said domain; responsive to receiving said at least one audio-visual element, generate a second text-based description of said domain and extract therefrom a second set of domain actions and a second set of associated action attributes; construct at least one finite state machine (FSM) corresponding to each of said extracted actions and said associated action attributes; convert said at least one FSM into a symbolic model that describes said domain, said symbolic model being written in a formal planning language.

In another embodiment of the invention, a computer program product generates a formal planning domain description. The computer program product comprises a computer readable storage medium having program instructions embodied therewith. The program instructions are executable by a computer to cause the computer to: receive, using said computer, a first text-based description of a domain in an AI environment, where said domain includes at least one action and at least one attribute associated therewith, said description being written in natural language; responsive to receiving said first text-based description of said domain, extract, using said computer, a first set of domain actions and a first set of associated action attributes; receive, using said computer, at least one audio-visual element depicting an aspect of said domain; responsive to receiving said at least one audio-visual element, generate, using said computer, a second text-based description of said domain and extract, using said computer, therefrom a second set of domain actions and a second set of associated action attributes; construct, using said computer, at least one finite state machine (FSM) corresponding to each of said extracted actions and said associated action attributes; convert, using said computer, said at least one FSM into a symbolic model that describes said domain, said symbolic model being written in a formal planning language.

The present disclosure recognizes the shortcomings and problems associated with manual development of symbolic domain models and seeks to overcome them. Aspects of the invention incorporate information from several sources, as well as sources of varying format and type. Aspects of the invention infer actions and conditions when not explicitly provided. Aspects of the invention also permit a user to augment a base version of a symbolic model, providing corrections as needed, thereby increase overall efficiency, while ensuring model accuracy.

The present invention also recognizes that manual domain model development can be difficult when ready-made task action reference resources are either not available for the desired domain model or only describe beginning and ending states of the task to be completed. The invention also recognizes that other difficulties include the need to explicitly detail a sequence of events when only limited information about the task is presented in a given reference.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
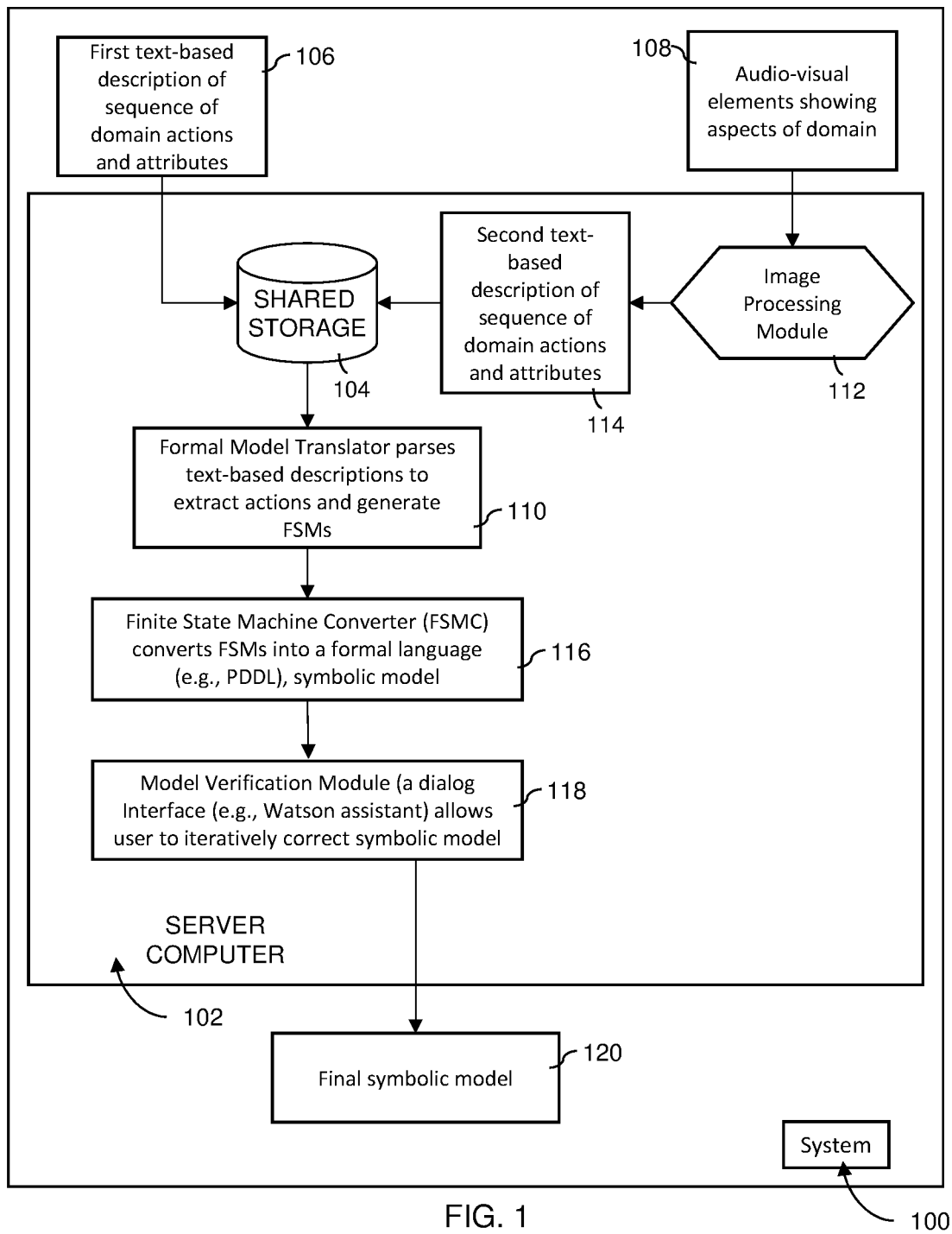
FIG. 1 is a schematic block diagram illustrating an overview of a system for computer-implemented, automated generation of symbolic models from multimodal data according to embodiments of the present invention.
Figure 2:
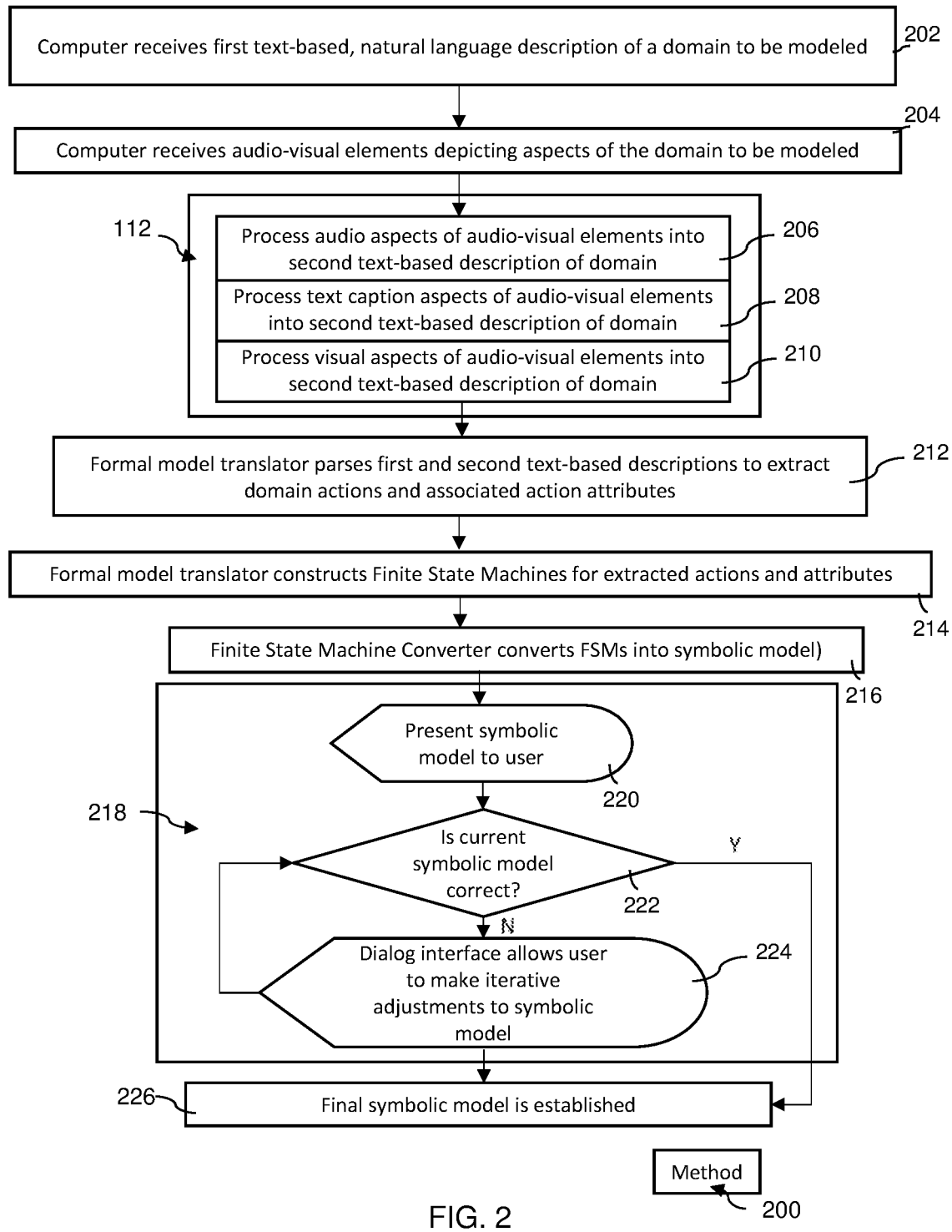
FIG. 2 is a flowchart illustrating a method, implemented using the system shown in FIG. 1, of automated generation of symbolic models from multimodal data according to aspects of the invention.

Now with combined reference to the Figures generally and with particular reference to FIG. 1 and FIG. 2, an overview of a method 200 for automated generation of symbolic models from multimodal data usable within a system 100 as carried out by a server computer 102 having optionally shared storage 104 and aspects that make model generation efficient and accurate, according to an embodiment of the present disclosure, is shown.

As shown in FIG. 1, the server computer 102 receives multiple sources of domain information 106, 108. One source shown is a text-based description of a sequence of domain actions and attributes 106, and a second source is an audio-visual element 108 showing aspects of the domain to be modeled. As used herein, the phrase domain refers to a domain model written in as used in artificial intelligence ("AI") based planning. A domain represents a task (e.g., result to be accomplished) including associated actions to be taken and operational arguments and conditions associated therewith. The text-based description, which can be provided through a simple text file or other computer readable form, is a list of phrases or sentences that collectively provide a description of the situation to be addressed and represented by the domain model. For example, one such text description 106 is as follows, "To make a cucumber salad, pick the knife from the table and slice the cucumber with the knife. Put the sliced cucumber into the bowl. The knife is on the table. The bowl is on the table." The text-based description 106 can vary in level of completeness, and it may not completely describe all aspects of the domain.

The audio-visual element 108 will help provide a more-complete overall description of the domain and may contain information that is complementary or redundant (in some cases, both) to the text description 106. The audio-visual element 108 can be obtained from a variety of sources, including news feeds, databases of instructional material, and multi-media teaching sources. Other sources may also suffice and can be selected by one skilled in this art. The audio-visual element 108 can be provided in a variety of formats, including one or more images, a time-based series of images, a video recording (with or with spoken accompaniment), or a sound recording with spoken elements. Other formats may also be selected, based on the judgment of one skilled in this art. It is also noted that when the audio-visual element 108 contains multiple images (for example, a video clip or slide show), temporal ordering of images provided and comparing time-based differences, may be especially useful when inferring implicit preconditions (such as a photo of an empty bowl indicating that a receiving bowl should be empty before beginning) and effects that are not stated explicitly in the text-based description, so they can be included in the domain and accurately included in the model generated.

The text-based description of domain actions and attributes 106 includes a natural language description of task-relevant actions (e.g., for a salad making task: hold knife in a hand, collect vegetables for salad, use the knife to make vegetable slices, put vegetable slices into a bowl, etc.) and goals (e.g., for a salad making task: the task is complete when the salad is ready). As more fully described below, the server computer 102 will use this natural language description as one source of input for action extraction in the Formal Model Translator (FMT) 110.

With continued reference to FIG. 1, the shared computer 102 receives one or more audio-visual elements 108 as a second source of domain actions and attributes. According to aspects of the invention, the audio-visual elements may include single images, a collection of related images (e.g., a group of images which may or may not have a temporal order), multi-media presentations, audio recordings, other recorded forms of expression. These audio-visual elements 108 are provided to an Image Processing Module (IPM) 112 where, as described more fully below, the content of the elements 108 is converted into text and processed into a second text-based description 114 of domain actions and attributes.

The FMT 110 is responsible for parsing the first and second text-based domain action and attribute descriptions 106, 114 to generate Finite State Machines (FSMs), in block 214, as described more fully below. The FMT 110 may generate, multiple FSMs, not shown, as needed to accurately represent each of the actions extracted by the FMT.

A Finite State Machine Converter (FSMC) converts the FSMs into a symbolic model 120, presented in a formal language (e.g., the Planning Domain Definition Language or PDDL). By presenting the model 120 in a symbolic format (e.g., shown as a sequence of actions), a user may interpret the model, and the Model Verification Module (MVM) 118 allows for user interaction to confirm model accuracy and allows the user to make adjustments as needed. Once the model 120 has been verified, it is presented for a variety of uses as selected by one of skill in this art.

Now with particular reference to FIG. 2, particular aspects of a method 200 for automated generation of symbolic models from multimodal data usable within the system 100 described above will be described.

At block 202, the server computer 102 receives a first text-based description 106 of a domain to be modeled. It is preferred that the description 106 be written in natural language format. It is possible to select other formats as chosen by one skilled in this art. The description will include instructions about how to achieve the intended results for the desired domain model 120. The text may include traditional task planning actions (including action conditions and effects) and goals; a set of directions to be followed; or various combinations of domain details as available and selected by one skilled in this art.

The server computer 102 receives, at block 204, one or more audio-visual elements that depict aspects of the domain to be modeled. These elements could be simple images and temporal activity slide sets (e.g., groups of slides having a specific time-based or timestamped order) with text content (e.g., captioning data). These elements could also include temporal activity multi-media slide sets, audio recordings, and video clips with embedded spoken content (e.g., recorded natural language). Other kinds of audio-visual content may also be provided as preferred by one skilled in this field.

The server computer 102, in the Image Processing Module 112, in the server computer 102, extracts text from various kinds of content 206, 208, 210 within the audio-visual elements 108 received in block 204 and compiles the extracts into a second text-based description 114 of the domain being modeled. More particularly, the Image Processing Module 112 will, at block 206, process audio aspects of audio-visual elements 108 to find descriptive spoken words or natural language content for compilation into a second text-based description 114 of the domain to be modeled. At block 208, the Image Processing Module 112 detects descriptive spoken words or natural language content within text caption content of audio-visual elements 108 for compilation into a second text-based description of the domain to be modeled. At block 210, the Image Processing Module 112 detects descriptive spoken words or natural language content within recorded audio portions of the audio-visual elements 108 for compilation into a second text-based description 114 of the domain to be modeled. It is noted that the audio-visual elements may also be processed (e.g., via image recognition models and associated deep learning algorithms to analyze selected images and to note differences between several selected images) to infer actions, conditions, and other attributes not expressly indicated in the text-based descriptions.

The second text-based description compiled in the Image Processing Module 112 and the first text-based description 106 collected at block 202 are both passed along to the FMT 110 for further processing at blocks 212 and 214, as described below. The FMT 110 of the server computer 102, in block 212, extracts domain actions and associated action attributes from the first and second natural language text-based descriptions 106, 114. Suitable parsing results may be achieved through use of the VerbNet or other similar lexical resources that derive semantic information from provided text. As is typical in AI planning applications, the extracted actions may be characterized by a set of preconditions (i.e., conditions which must be satisfied before the extracted action can be performed) and effects (i.e., a set of conditions that are modified when the associated action is applied).

At block 214, the FMT 110 of the server computer 102 constructs finite state machines in accordance with the extracted actions and attributes. The FMT 110 uses any suitable extraction method selected by one skilled in the art. One suitable method is to use a learning system, such as Learning Object Centered Models (e.g., LOCM, LOCM2, etc.), or other similar inductive system as selected by one skilled this art, to perform automated induction of the domain model from action traces. An FSM is defined by a list of its states, its initial state, and the inputs that trigger each transition, and the FMT determines the each of requisite aspects needed to generate FSMs appropriate to reflect the domain to be modeled. The FSMs are transferred, at block 216, to a Finite State Machine Converter (FSMC) 116 which transforms each FSM into a corresponding symbolic language depiction (such as with PDDL elements) of the action represented by the FSM.

At block 218, the MVM 118 allows a user to interactively review the symbolic model generated in block 216. In particular, the MVM 118, at block 220, presents the symbolic model generated by FSMC 116 to a user for review. Input from the user is used, at block 222, to determine whether the presented model is sufficient. If the user indicates that no changes are needed, the MVM 118 attributes final model status to the current model.

If the user indicates that changes are needed, then the server computer 102, at block 224 presents the user with interactive dialog elements, such as those collectively known as the "Watson Assistant", available from International Business Machines corporation or other suitable interactive interface selected by one skilled in this field, where the user is permitted to make changes to the model presented as deemed necessary for model accuracy by the user. With each model change made by the user, the server computer queries the user, at block 222, regarding adequacy. Once the user confirms no more model changes are needed, the MVM 118 attributes final model status to the current model.

Once final model status is attributed, the current model is provided as output from the MVM 118. Output from the MVM 118 is established by the server computer 102, at block 226, as the final symbolic model, and the final symbolic model 120 is available to describe the domain as needed.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
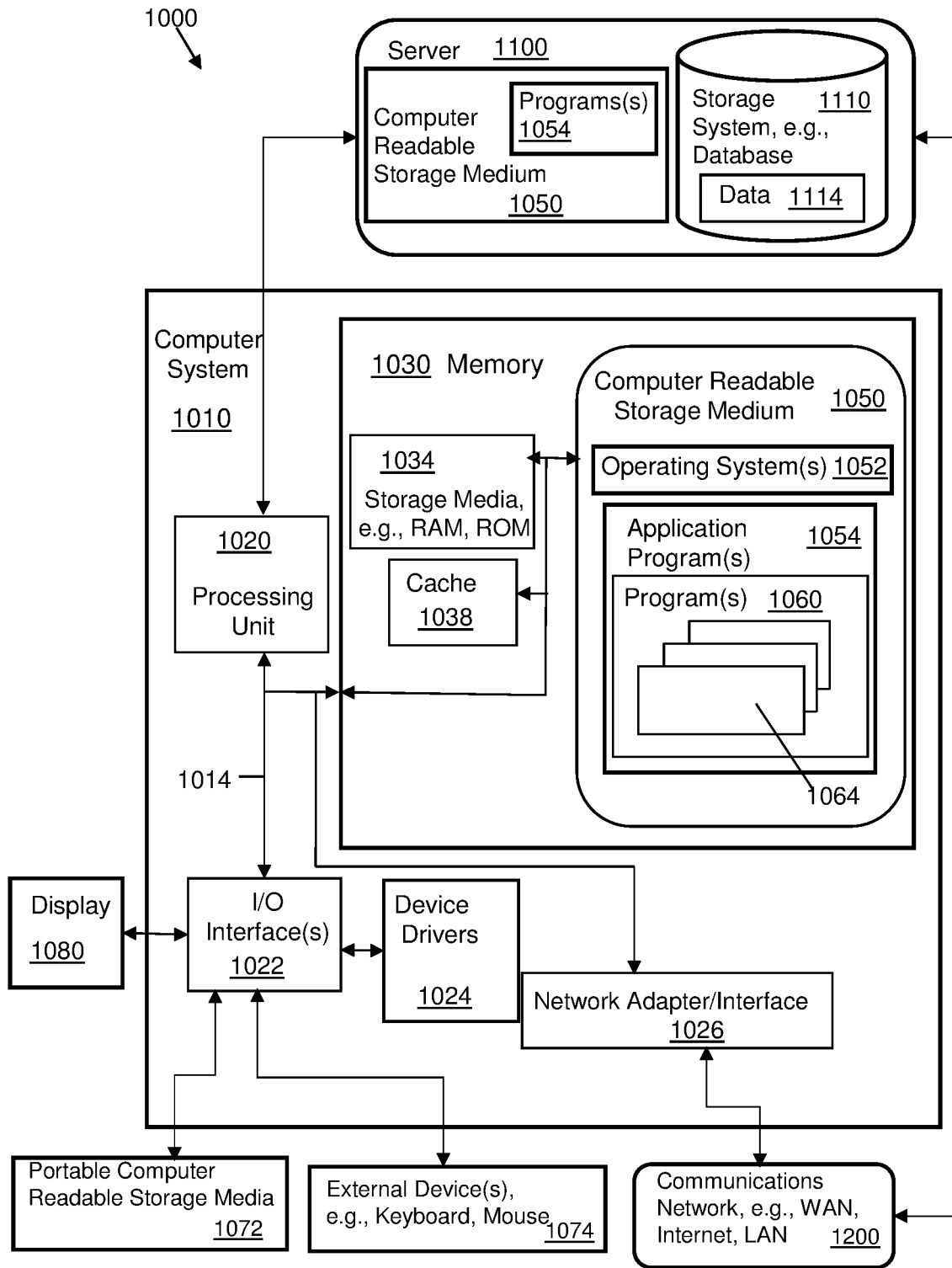
FIG. 3 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 3, a system or computer environment 1000 includes a computer diagram 1010 shown in the form of a generic computing device. The method 200, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non- volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
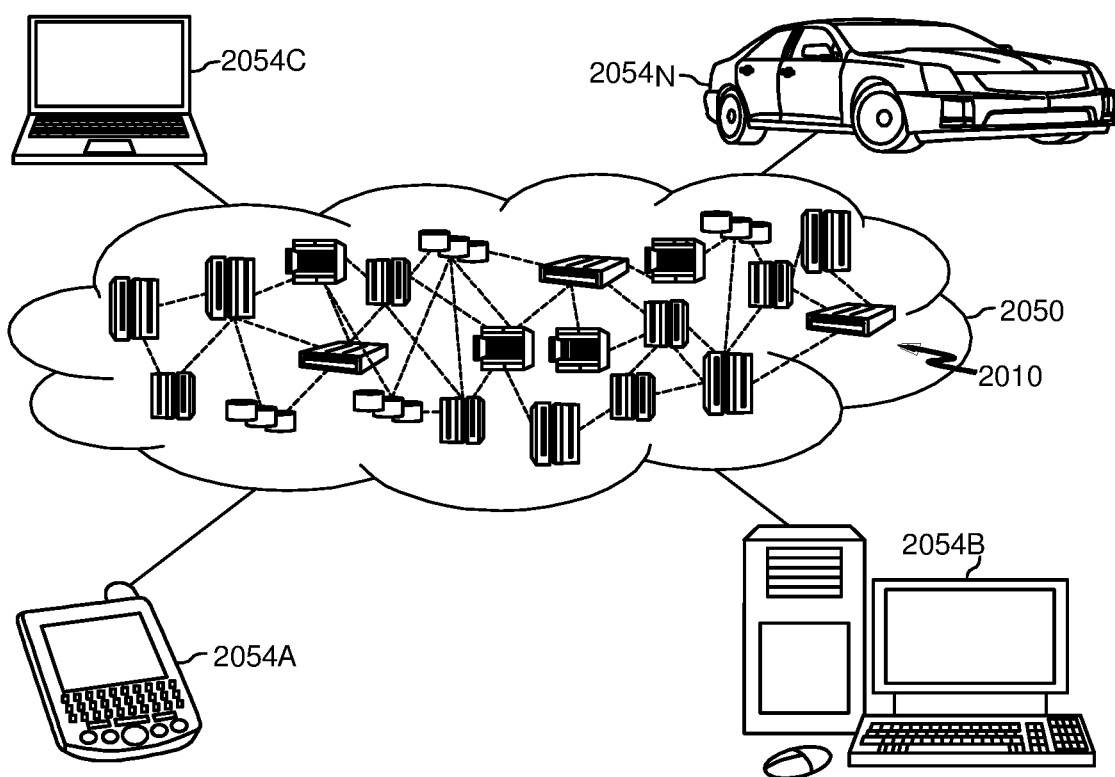
FIG. 4 depicts a cloud computing environment according to an embodiment of the present invention.

Referring now to FIG. 4, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 4 are intended to be illustrative only and that computing nodes 2010 and cloud computing environment 2050 can communicate with any type of computerized device over any type of network and/or network addressable connection (e.g., using a web browser).

Figure 5:
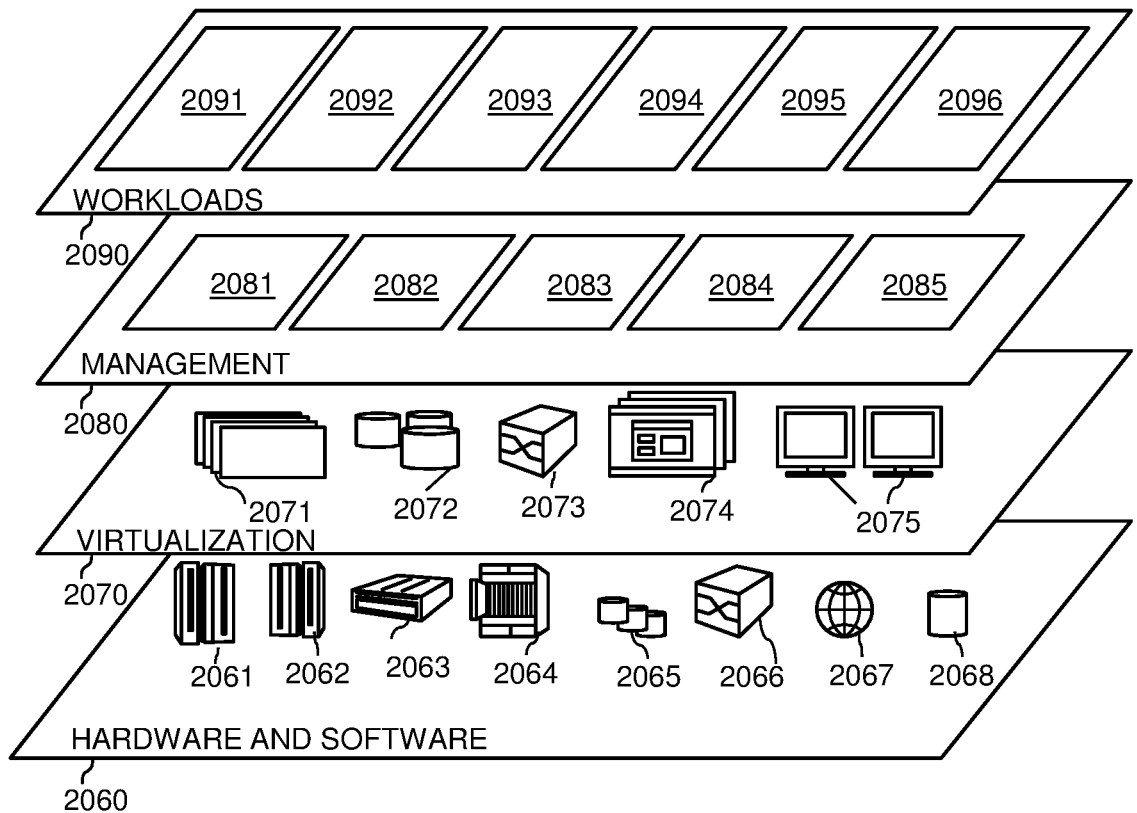
FIG. 5 depicts abstraction model layers according to an embodiment of the present invention.

Referring now to FIG. 5, a set of functional abstraction layers provided by cloud computing environment 2050 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and generating a formal planning domain description 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. computer implemented method to generate a formal planning domain description, comprising:

receiving, by said computer, a first text-based description of a domain in an AI environment, where said domain includes at least one action and at least one attribute associated therewith, said first text-based description being written in natural language;

responsive to receiving said first text-based description of said domain, extracting therefrom by said computer, a first set of domain actions and a first set of associated action attributes;

receiving, by said computer, at least one audio-visual element depicting an aspect of said domain;

responsive to receiving said at least one audio-visual element, generating by said computer, a second text-based description of said domain and extracting therefrom, by said computer, a second set of domain actions and a second set of associated action attributes;

providing the audio-visual element to an Image Processing Module (IPM), and the IPM converting content of the element into text and processing the element into the second set of domain actions and the second set of associated action attributes; the converting includes processing audio aspects of the audio-visual element to find descriptive spoken words or natural language content for compilation into the second text-based description of the domain to be modeled;

constructing, by said computer, at least one finite state machine (FSM) corresponding to each of said extracted actions and said associated action attributes; and converting, by said computer, said at least one FSM into a symbolic model that describes said domain, said symbolic model being written in a formal planning language.

2. he method of claim 1, wherein said extracting of said sets of domain actions and said sets of associated action attributes includes semantic parsing of said text-based descriptions.

3. The method of claim 1, wherein said at least one audio-visual element includes a temporal sequence of images depicting one or more specific aspects of said domain.

4. he method of claim 1, wherein at least a portion of said second text-based description of said domain is generated by said computer with reference to an image recognition module.

5. The method of claim 1, wherein said formal planning language is Planning Domain Definition Language (PDDL).

6. he method of claim 1, wherein said computer includes an interactive interface and wherein said symbolic model is provided, by said computer, to a user via said interactive interface for user input and adjustment of said model responsive to said user input.

7. The method of claim 1, wherein said computer uses a deep learning algorithm to infer at least one action attribute not stated in said text-based descriptions.

8. The method of claim 1, wherein at least one of said sets of action attributes includes an action precondition and an action effect.

9. The method of claim 1, wherein said generating of said second text-based description of said domain is conducted by said computer with reference to aspects of said at least one audio-visual element selected from a list consisting of audio aspects, textual captioning aspects, and visual aspects.

10. system to generate a formal planning domain description, which comprises:
a computer system comprising a computer readable storage medium having program instructions embodied therewith, the program instructions executable by a computer to cause the computer to:
receive a first text-based description of a domain in an AI environment, where said domain includes at least one action and at least one attribute associated therewith, said first text-based description being written in natural language;
responsive to receiving said first text-based description of said domain, extract a first set of domain actions and a first set of associated action attributes;
receive at least one audio-visual element depicting an aspect of said domain;
responsive to receiving said at least one audio-visual element, generate a second text-based description of said domain and extract therefrom a second set of domain actions and a second set of associated action attributes;

provide the audio-visual element to an Image Processing Module (IPM), and the IPM converting content of the element into text and processing the element into the second set of domain actions and the second set of associated action attributes; the converting includes processing audio aspects of the audio-visual element to find descriptive spoken words or natural language content for compilation into the second text-based description of the domain to be modeled;

construct at least one finite state machine (FSM) corresponding to each of said extracted actions and said associated action attributes; and convert said at least one FSM into a symbolic model that describes said domain, said symbolic model being written in a formal planning language.

11. The system of claim 10, wherein said extracting of said sets of domain actions and said sets of associated action attributes includes semantic parsing of said text-based descriptions.

12. The system of claim 10, wherein said at least one audio-visual element includes a temporal sequence of images depicting one or more specific aspects of said domain.

13. The system of claim 10, wherein at least a portion of said second text-based description of said domain is generated by said computer with reference to an image recognition module.

14. The system of claim 10, wherein said formal planning language is Planning Domain Definition Language (PDDL).

15. The system of claim 10, wherein said computer includes an interactive interface and wherein said symbolic model is provided, using said computer, to a user via said interactive interface for user input and adjustment of said model responsive to said user input.

16. The system of claim 10, wherein said computer uses a deep learning algorithm to infer at least one action attribute not stated in said text-based descriptions.

17. The system of claim 10, wherein at least one of said sets of action attributes includes an action precondition and an action effect.

18. The system of claim 10, wherein said generating of said second text-based description of said domain is conducted by said computer with reference to aspects of said at least one audio-visual element selected from a list consisting of audio aspects, textual captioning aspects, and visual aspects.

19. computer program product to generate a formal planning domain description, the computer program product comprising a computer readable storage medium having program instructions embodied therewith, the program instructions executable by a computer to cause the computer to:
receive, using said computer, a first text-based description of a domain in an AI environment, where said domain includes at least one action and at least one attribute associated therewith, said first text-based description being written in natural language;
responsive to receiving said first text-based description of said domain, extract, using said computer, a first set of domain actions and a first set of associated action attributes;
receive, using said computer, at least one audio-visual element depicting an aspect of said domain;
responsive to receiving said at least one audio-visual element, generate, using said computer, a second text-based description of said domain and extract, using said computer, therefrom a second set of domain actions and a second set of associated action attributes;

provide the audio-visual element to an Image Processing Module (IPM), and the IPM converting content of the element into text and processing the element into the second set of domain actions and the second set of associated action attributes; the converting includes processing audio aspects of the audio-visual element to find descriptive spoken words or natural language content for compilation into the second text-based description of the domain to be modeled;

construct, using said computer, at least one finite state machine (FSM) corresponding to each of said extracted actions and said associated action attributes; and convert, using said computer, said at least one FSM into a symbolic model that describes said domain, said symbolic model being written in a formal planning language.

20. The computer program product of claim 19, wherein said computer includes an interactive interface and wherein said symbolic model is provided, by said computer, to a user via said interactive interface for user input and adjustment of said model responsive to said user input.

\* \* \* \* \*